United States Patent [19]
Patterson et al.

[11] Patent Number: 5,970,855
[45] Date of Patent: Oct. 26, 1999

[54] PORTABLE KITCHEN WITH MOVABLE COOKING UNIT

[76] Inventors: Vance M. Patterson; Mary J. Patterson, both of 4950 Canterbury Pl., Morganton, N.C. 28655; Donald J. Thomas, 11742 Laurelview La., Cincinnati, Ohio 45249

[21] Appl. No.: 09/044,184

[22] Filed: Mar. 19, 1998

[51] Int. Cl.[6] .................................................. A47J 37/07
[52] U.S. Cl. ................................ 99/422; 99/423; 99/425; 99/427; 99/446
[58] Field of Search ............................. 99/446, 393, 396, 99/423, 443 R, 427, 391, 450, 422, 425, 426; 126/25 A, 25 R

[56] References Cited

U.S. PATENT DOCUMENTS

| | | |
|---|---|---|
| 246,561 | 8/1881 | Sassinot et al. . |
| 3,664,321 | 5/1972 | Chiou . |
| 3,928,045 | 12/1975 | Tsunoda et al. .......................... 99/330 |
| 4,144,870 | 3/1979 | Reynolds ................................ 126/41 E |
| 4,840,118 | 6/1989 | Rinehart ................................... 99/446 |
| 4,862,792 | 9/1989 | Lerma, Jr. .................................. 99/401 |
| 5,213,027 | 5/1993 | Tsotsos et al. ............................. 99/339 |
| 5,529,053 | 6/1996 | Carter et al. ........................... 126/25 R |

Primary Examiner—David Lacey
Assistant Examiner—Drew Becker
Attorney, Agent, or Firm—Sughrue, Mion, Zinn, Macpeak & Seas, PLLC

[57] ABSTRACT

A portable grill or portable kitchen unit for outdoor use, and includes a cooking unit which is translatable between a position over a heat source and a position laterally adjacent to the heat source, for cooling and/or further preparation of foods being cooked within the unit.

23 Claims, 6 Drawing Sheets

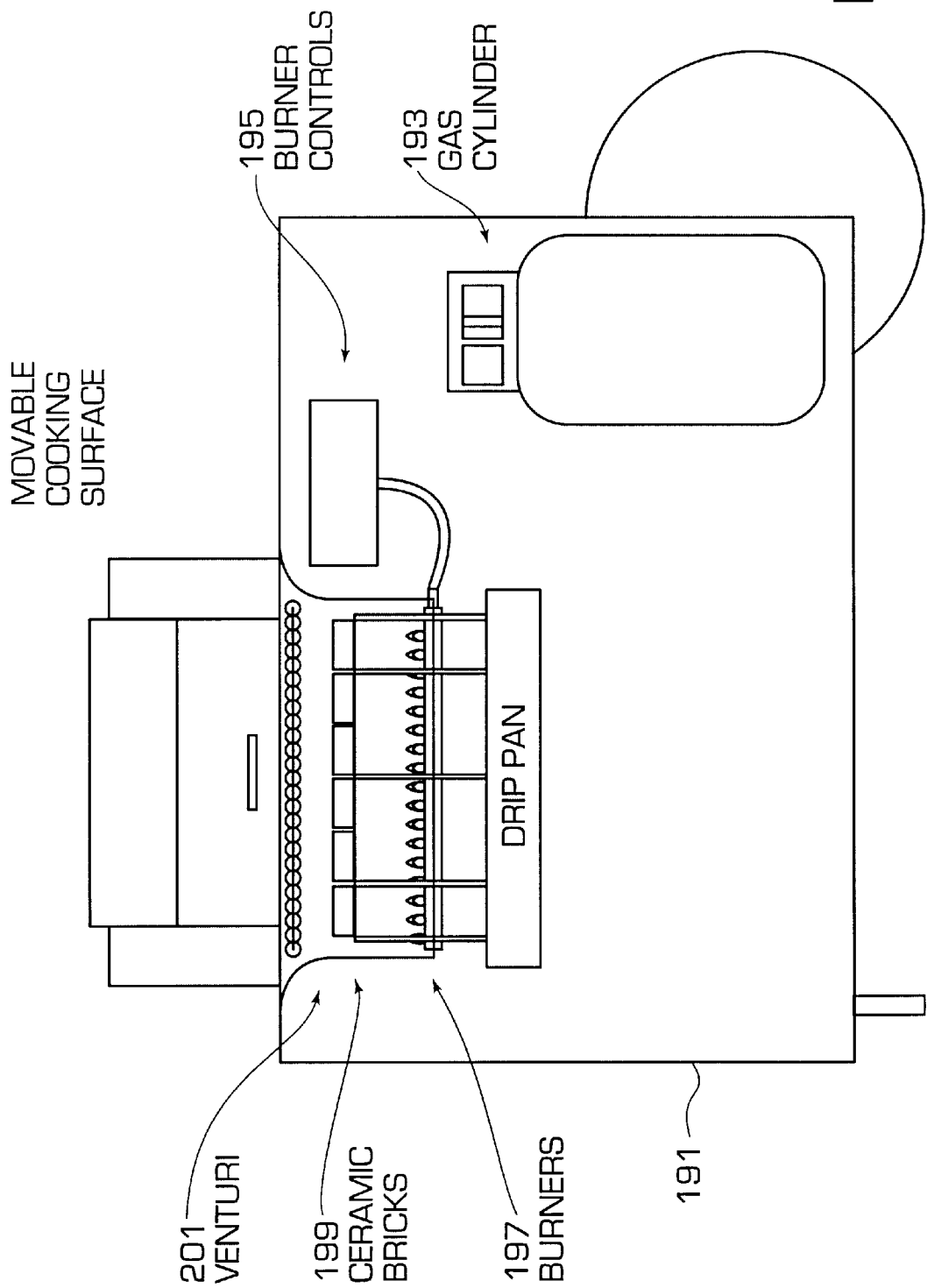

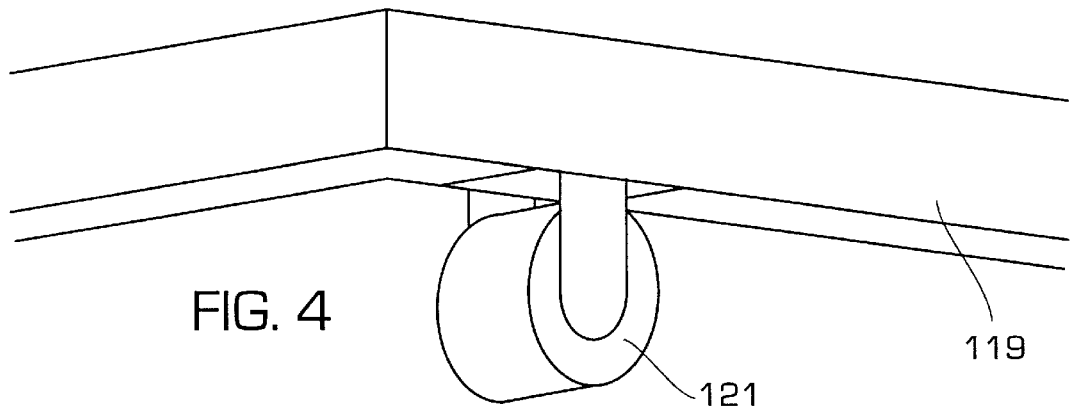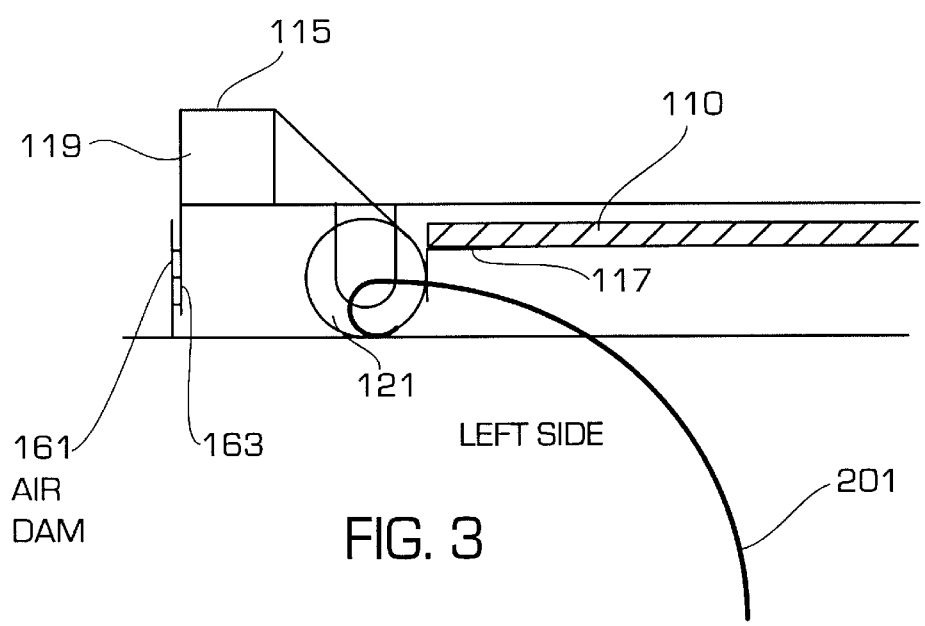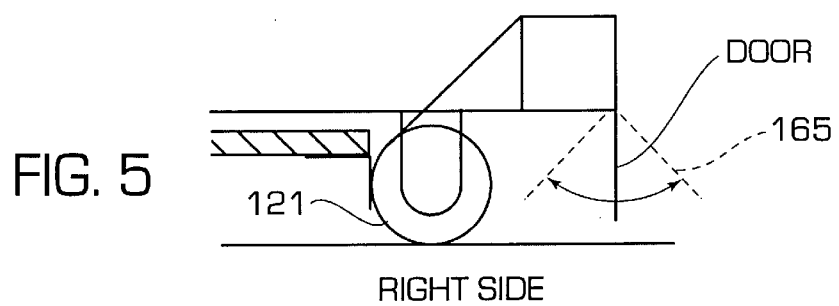

PORTABLE KITCHEN WITH MOVABLE COOKING UNIT

BACKGROUND OF THE INVENTION

1. Field of the Invention

The invention relates to portable grill or portable kitchen units designed for outdoor use, and in particular to an outdoor portable kitchen unit which includes a cooking unit which is translatable between a position over a heat source and a position laterally adjacent to the heat source, for cooling and/or further preparation of the foods being cooked within the unit.

2. Description of the Related Art

Portable outdoor grills have been known for many years, and recently the trend has been toward more complex units, offering larger cooking areas and greater degree of heat source control. However, a need has existed for units with incorporated food preparation areas, as well as a more convenient means of removing the cooked foods from the burner region for cooling an/or further preparation. It is therefore an object of the present invention to fulfil these needs, by providing a portable kitchen unit having food preparation areas on either side of the cooking area, and being provided with a grill or grate-style cooking surface which, together with an incorporated grate support/surround and a hood unit, is translatable fully laterally to one side of the heat source/burners, so as to provide a convenient means of removing the cooked foods from the heat source for cooling and/or further preparation.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
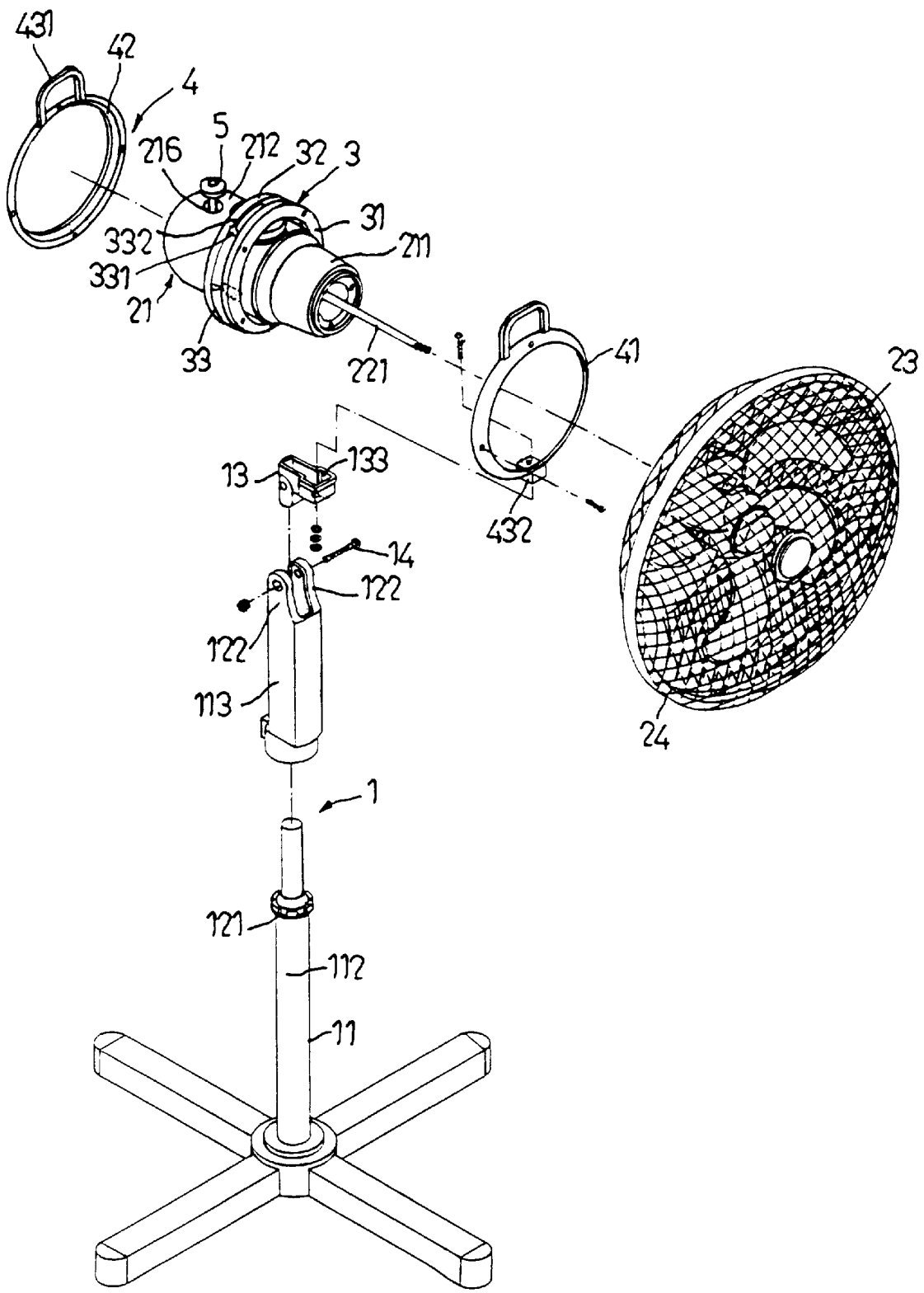
FIGS. 1A–1D are views of the front, side and top of the portable kitchen of the invention, with FIG. 1A schematically illustrating the primary internal components.

FIG. 1A illustrates schematically the general constitution of the portable kitchen unit, with base 191 housing a removable gas cylinder 193, gas burner controls 195 and burners 197 of conventional type. Above burners 197 are located a series of ceramic bricks 199 for heat retention and uniform heat radiation for cooking. A grate or grill 110 of conventional form is located a short distance above ceramic bricks 199. Ceramic bricks 199, and, to some extent, burners 197, are located within venturi 201, and together constitute the heat source for the invention. Venturi 201 is described in U.S. Pat. No. 5,529,053, and has several inherent advantages over conventional grill bodies. The disclosure of said patent is hereby incorporated herein by reference.

Figure 1B:
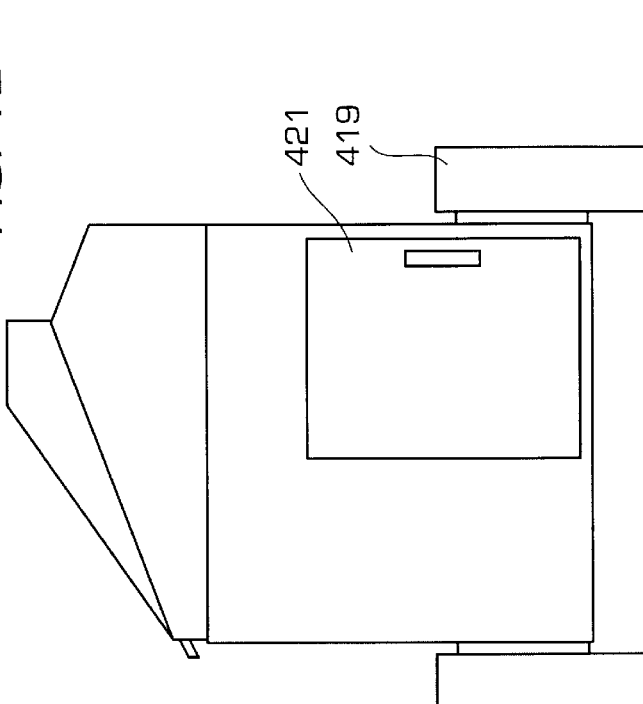
Figure 1C:
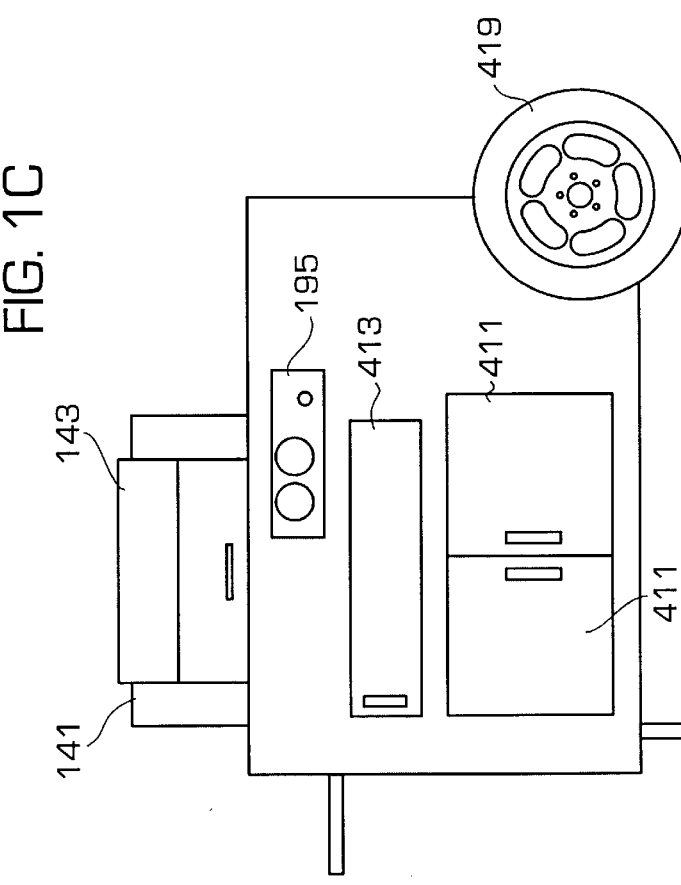

FIGS. 1B and 1C illustrate the external appearance of the portable kitchen, wherein base 191 is provided with storage areas, which may include a refrigerated compartment, accessed by doors 411, and drip pan access via door 421. The unit is mounted on at least two wheels 419 for portability, and includes door 421 shown in FIG. 1B for access to and replacement or replenishment of gas cylinder 193.

Figure 1D:
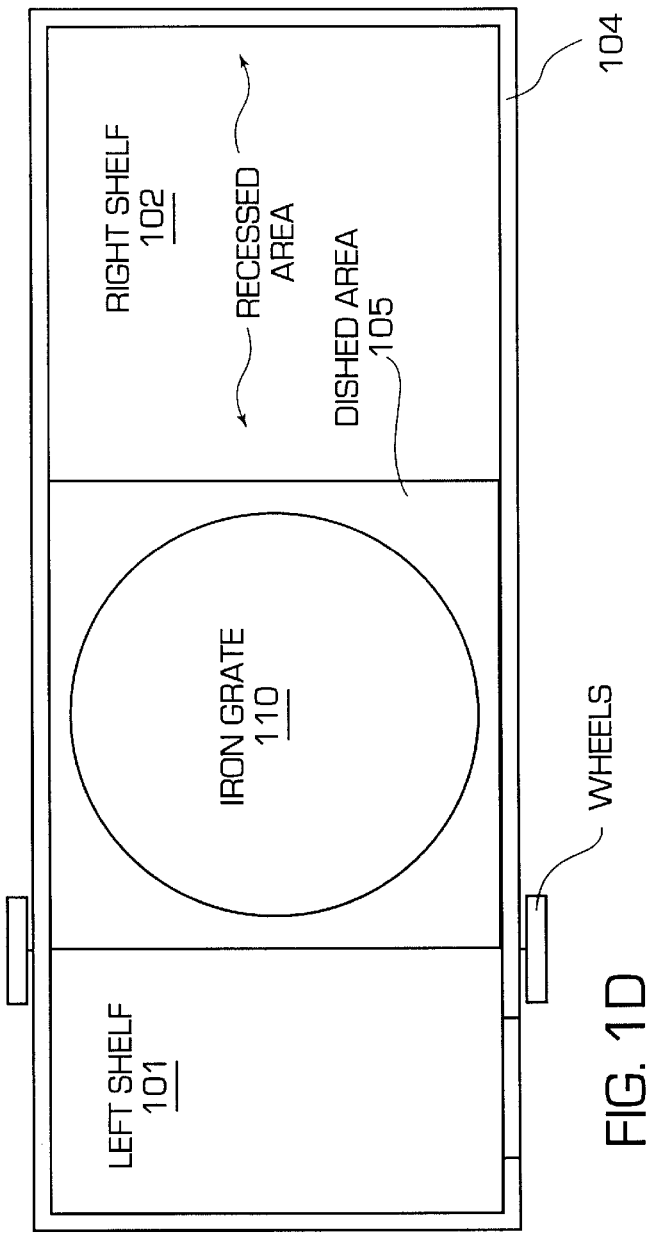

As shown in FIG. 1D, the top surface of the portable kitchen unit is of generally rectangular cross-section and includes a left shelf 101 and a right shelf 102 for, e.g., food preparation, on either side of a movable cooking area generally designated by numeral 103. The shelves may be surfaced with a hard, non-porous material such as ceramic tile, Corian or similar materials such as are commonly used for countertops and/or cutting boards. The shelves 101, 102 and cooking area 103 are surrounded by a small ledge 104 to limit spillage and to prevent items such as cooking utensils or food items from inadvertently falling off the shelf surfaces. Cooking area 103 includes grill surface or grate 110 of conventional form, surrounded and supported by rectangular dished member 105, which may be constructed of stainless steel. The dished member 105, as best seen in the cross-sectional view of FIG. 2, has an upper surface 112 having a slight slope. The surface 112 may be of substantially conical form overall, or may be formed of four planar but equally sloped sides, and is surrounded by a flat outer ledge 115, shown best in FIG. 3. The inner peripheral portion 117 of the dished member 105 is of annular form, and provides support for the outer periphery of grill or grate 110. In addition to providing for easy cleaning, the dished member 105 also allows spattered grease or oil to flow back toward the cooking surface, rather than outward toward ledges 101, 102.

Figure 4:
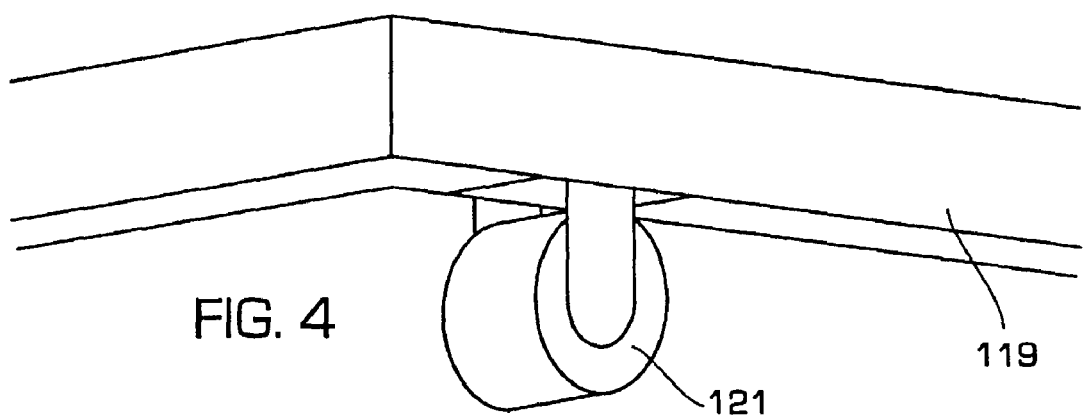
FIGS. 3–5 illustrate details of the translation assembly.
Figure 3:
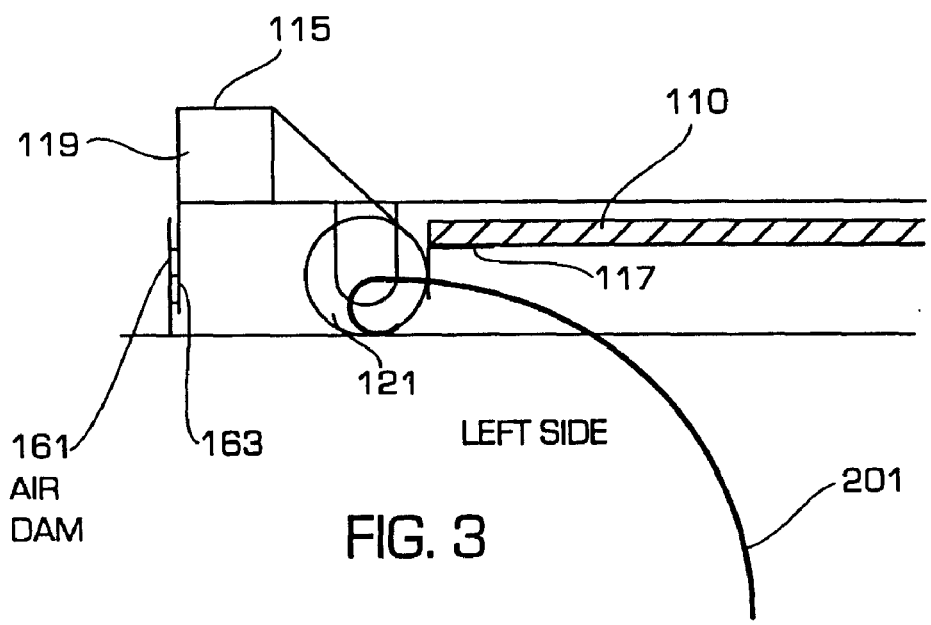

Referring further to FIG. 3, the mechanism for translating the cooking surface is shown. Under ledge 115 is located a square frame 119 which extends beneath the entire periphery of the ledge. At four locations of the frame 119, near corners thereof, as shown in FIG. 4, are located small wheels or casters 121 which support the frame 119, the dished member 105, the grate 110 and hood 140 (described below). The casters 121 are arranged so as to be radially outboard of both grate 110 and the underlying venturi 201.

The normal cooking position is shown in FIG. 3, where the grate 110 is centered above the opening of venturi 201. As shown, the casters 121 are located approximately even with a tangent of the venturi 201 drawn in the widthwise direction of the shelves 101, 102. At the leftmost end of dished member 105 is formed an air dam 161, a portion of which is formed by a skirt 163 extending downwardly from frame element 119. At the rightmost side, shown in FIG. 5, the skirt 165 is hinged, to allow for movement of the dished member/grate combination over obstructions, such as an auxiliary deck, cutting surface or drip pan (not shown) located on the top surface of shelf 102. Thus, with reference to FIG. 1D, the entire cooking unit, composed of dished member 105, grate 110 and hood 140, can be translated from the illustrated position to a position at the extreme right of shelf 102, with the hinged skirt 165 in this position being displaced slightly by the right hand portion of ledge 104. Although not shown in FIG. 1, casters 121 would be located beneath dished surface 105 at locations approximately denoted by characters "X" in the figure, proximate the front and rear portions of ledge 104.

Although not shown in the drawings, venturi 201 may be fitted with a fixed or removable second grate located below grate 110, such that when the cooking unit is translated to the right in FIG. 1, cooking of other foods may be performed simultaneously with the cooling and/or further preparation of the foods on grate 110.

Figure 5A:
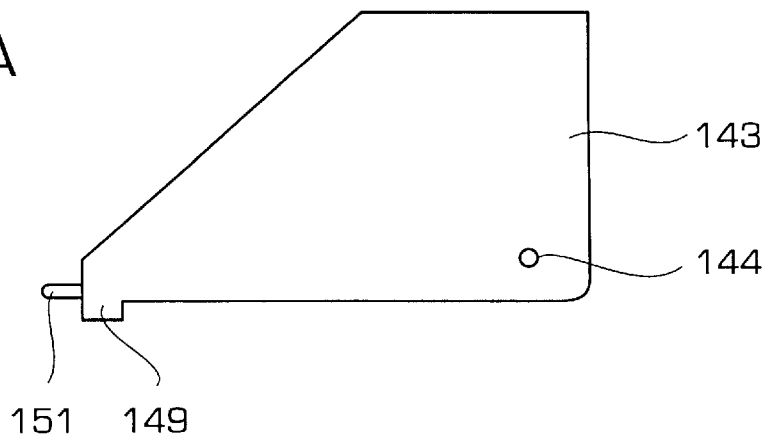
FIGS. 5A–5C show details of the hood assembly.
Figure 5B:
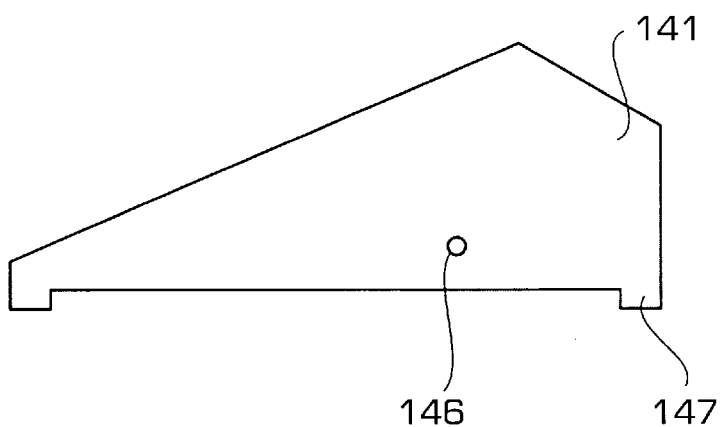
Figure 5C:
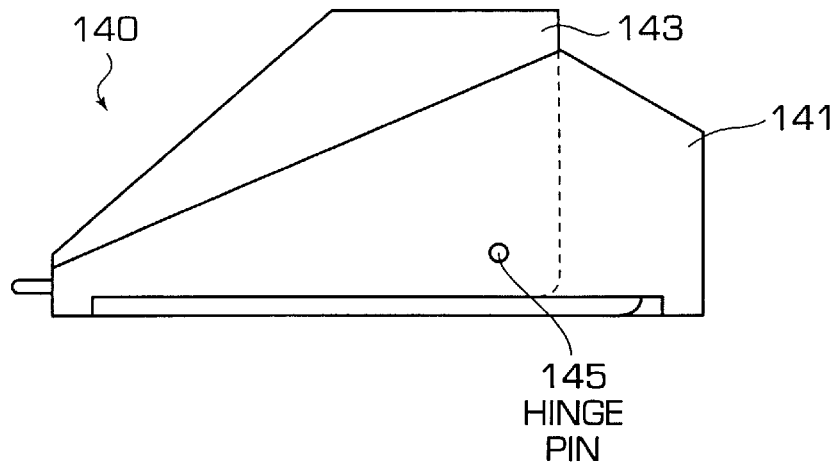
Figure 1B:
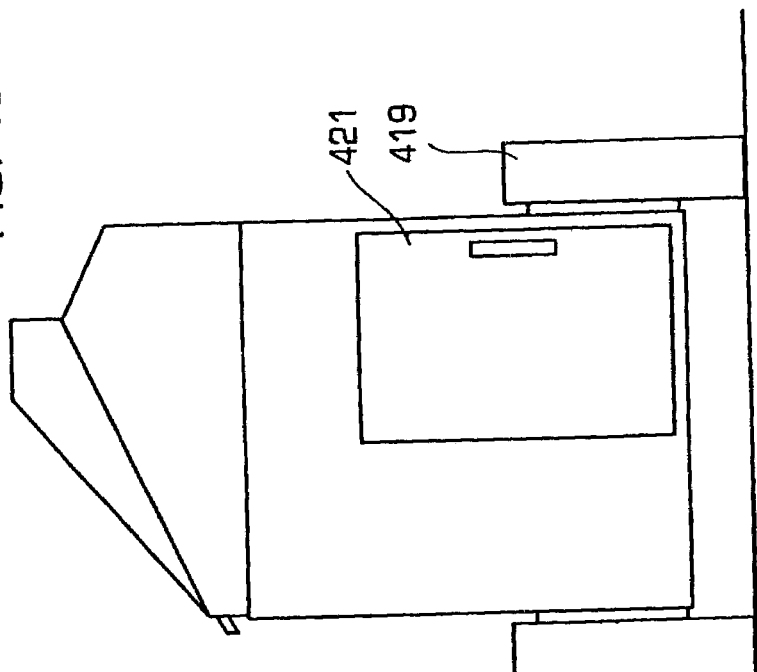
Figure 1C:
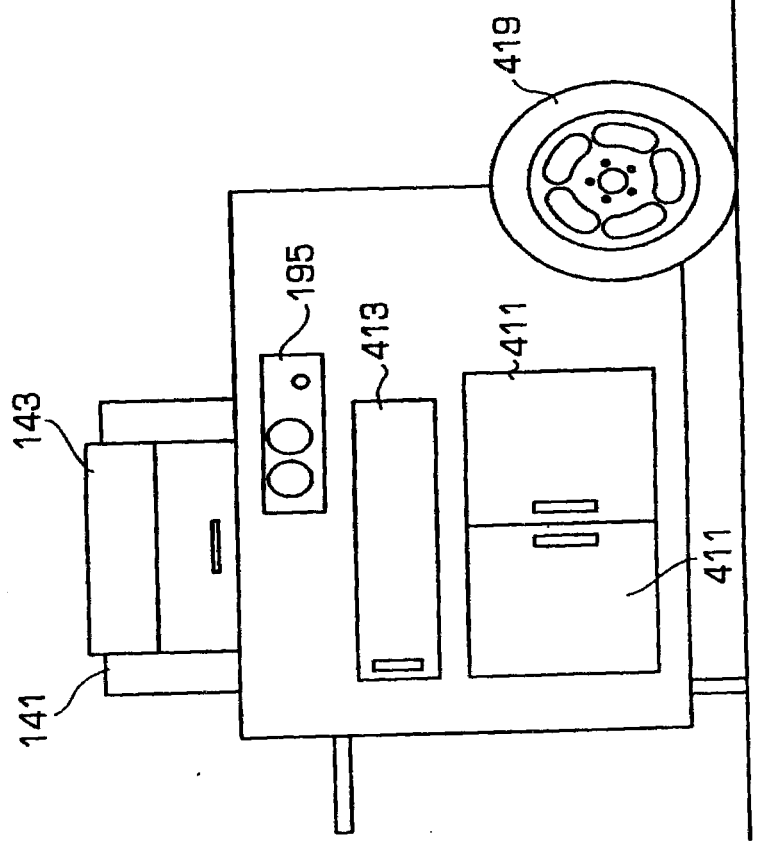
Figure 1D:
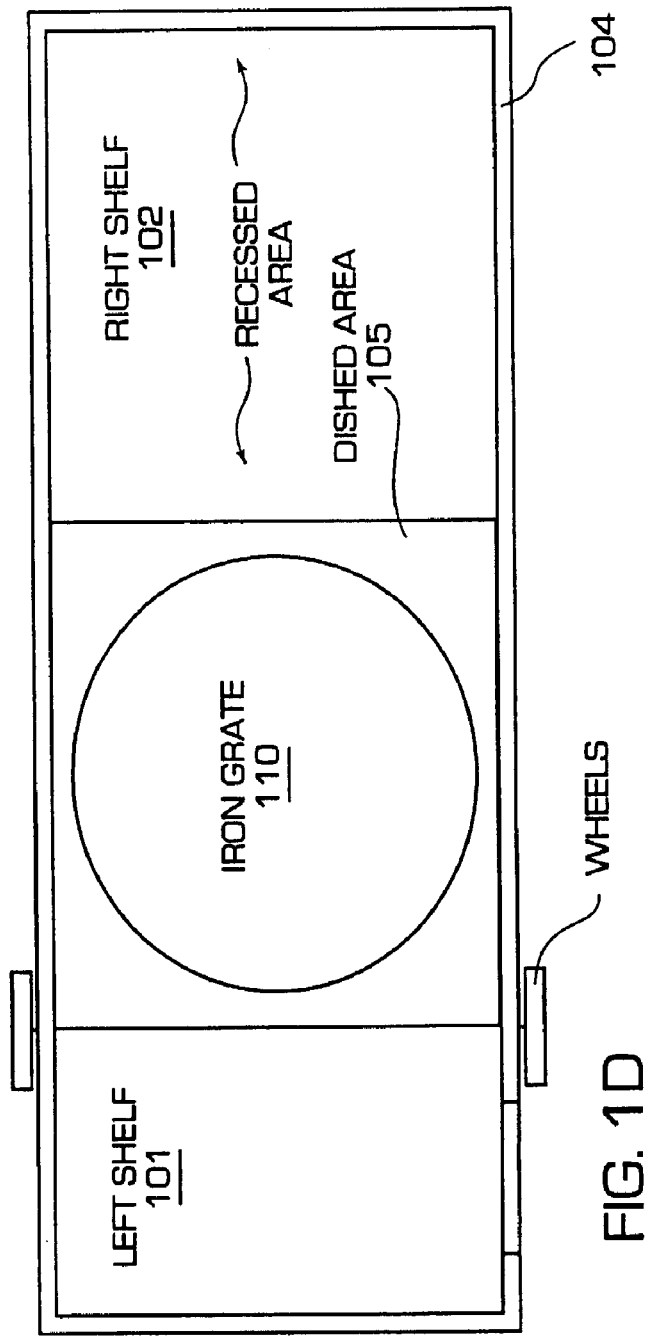
Figure 2:
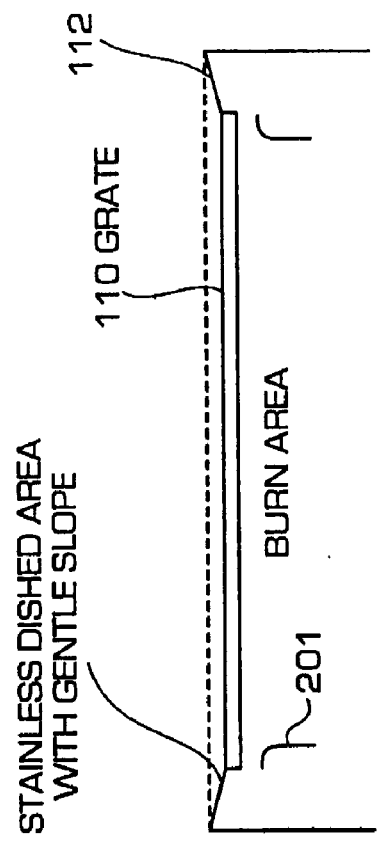

FIGS. 5A–5C illustrate the hood assembly 140, which includes stationary portion 141 and rotatable lid portion 143.

The lid portion 143, shown separately in FIG. 5A, is essentially trapezoidal in cross-section, and includes handle 151 at its front end and fittings 144 for hinge pins 145 at its rear end.

Lid 143 is pivotally mounted with respect to stationary portion 141, pictured separately in FIG. 5B. Stationary portion 141 is of polygonal shape and includes fittings 146 for hinge pins 145, which form the pivotal mount for lid 143. At its front and rear ends, stationary portion 141 includes lips 147 which fit over frame 119 of dished member 105 and may be suitably affixed thereto.

Lid 143 also includes lip 149 which fits over frame 119 when the lid is closed, the lips 147 and 149 being coincident in downward extension, when lid 143 is closed, to present an essentially unbroken line when viewed from the front of the portable kitchen. As noted above, since the hood assembly 140 is mounted to the dished member 105, it is translatable therewith when the former is moved to the right or left in FIG. 1.

Although several exemplary embodiments have been herein shown and described, those of skill in the art will recognize that many modifications and variations are possible, and it is intended to measure the invention only by the appended claims.

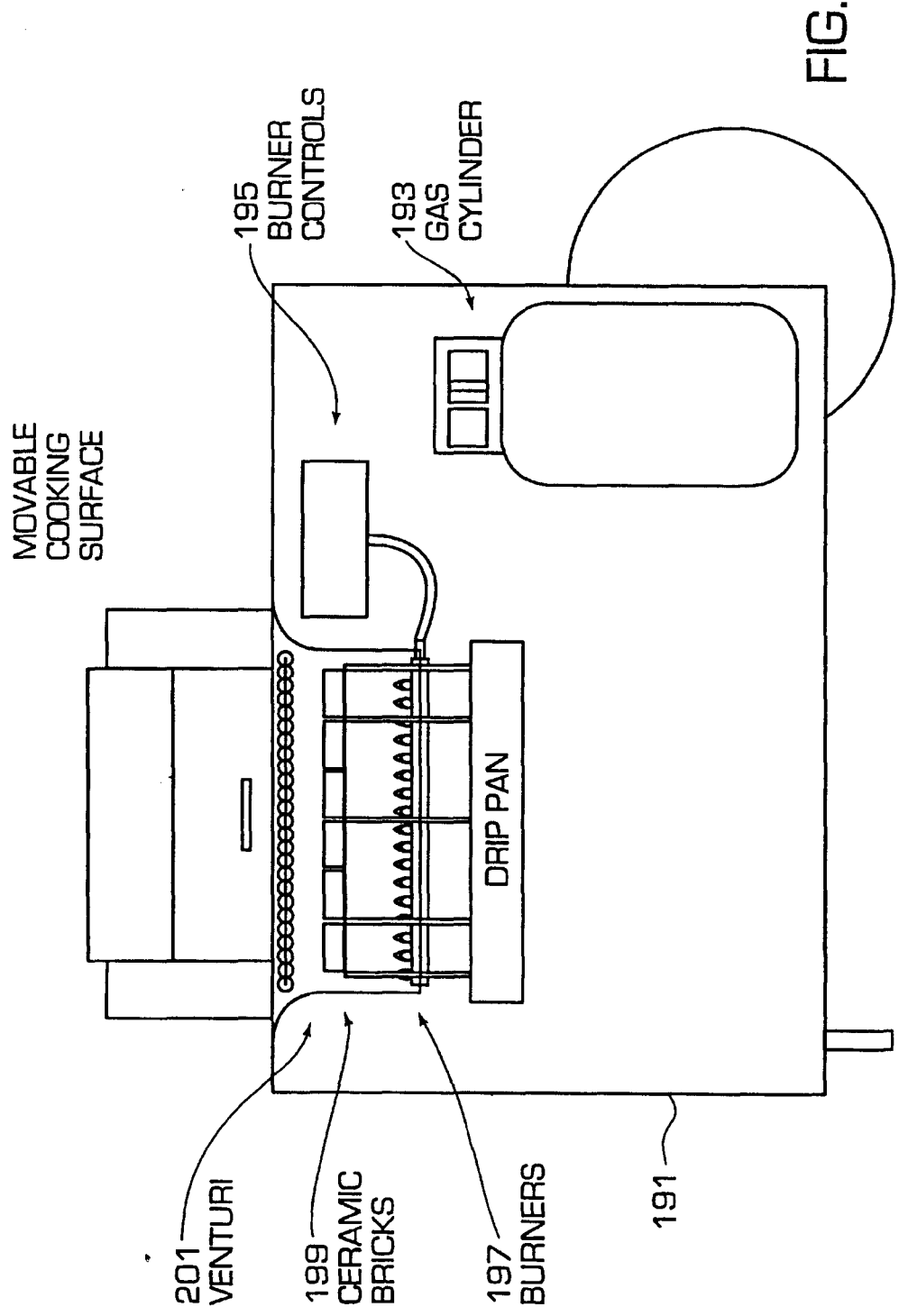

What is claimed is:

1. A portable kitchen for outdoor use, comprising:
   a cooking surface;
   a support for said cooking surface;
   a heat source;
   a front side from which a cook normally accesses said cooking surface for cooking;
   opposing adjacent sides at both ends of said front side; and
   translation means for linearly transporting at least said cooking surface and said support from a first position over said heat source to a second position linearly offset from said heat source, wherein said second position is linearly offset from said heat source in a direction of one of said adjacent sides.

2. A portable kitchen for outdoor use as in claim 1, wherein said offset is such that said cooking surface and said support are transportable to a position wherein no part of said cooking surface or said support remain above said heat source.

3. A portable kitchen for outdoor use as in claim 1, further comprising a hood unit disposed on a top surface of said support, and transportable together with said support.

4. A portable kitchen for outdoor use as in claim 1, wherein said portable kitchen includes a platform on at least one side of said support, upon which said support rests upon being transported away from said heat source.

5. A portable kitchen for outdoor use as in claim 1, wherein said translation means includes a frame located beneath a top surface of said support, said frame being supported by conveyance means for transporting said support.

6. A portable kitchen for outdoor use as in claim 5, wherein said conveyance means comprise wheels or casters.

7. A portable kitchen for outdoor use as in claim 5, wherein said top surface of said support includes a dished portion sloped toward said cooking surface.

8. A portable kitchen for outdoor use as in claim 7, wherein said dished portion is formed of stainless steel.

9. A portable kitchen for outdoor use as in claim 7, wherein at least one side of said support includes a hinged skirt pivotably movable to a position beneath said support.

10. A portable kitchen for outdoor use as in claim 1, wherein an inner periphery of said support includes a ledge for supporting said cooking surface.

11. A portable kitchen for outdoor use as in claim 1, further including a housing for containing said heat source, said housing further containing a source of fuel for said heat source.

12. A portable kitchen for outdoor use as in claim 11, wherein said housing further contains a refrigeration unit.

13. A portable kitchen for outdoor use as in claim 4, wherein said platform includes a food preparation surface.

14. A portable kitchen for outdoor use as in claim 4, wherein said platform includes a drip pan.

15. A portable kitchen for outdoor use as in claim 4, wherein said platform has a length which is equal to or greater than that of said support.

16. A portable kitchen for outdoor use as in claim 1, further including an auxiliary cooking surface positionable beneath said cooking surface.

17. A portable kitchen for outdoor use as in claim 1, wherein said heat source includes at least one burner element.

18. A portable kitchen for outdoor use as in claim 17, wherein said at least one burner element is located within a venturi.

19. A portable kitchen for outdoor use as in claim 18, further including an auxiliary cooking surface positionable beneath said cooking surface, and wherein said auxiliary cooking surface is supported directly by said venturi.

20. A portable kitchen for outdoor use as in claim 1, wherein said translation means includes a wheeled transport located beneath at least one portion of said support.

21. A portable kitchen for outdoor use, comprising:
    a cooking surface;
    a support for said cooking surface;
    a heat source;
    a front side from which a cook normally accesses said cooking surface for cooking; and
    opposing adjacent sides at both ends of said front side; and
    wherein said cooking surface and said support are slidably supported to be transported from a first position over said heat source to a second position linearly offset from said heat source, wherein said second position is linearly offset from said heat source in a direction of one of said adjacent sides.

22. A portable kitchen for outdoor use, comprising:
    a cooking surface;
    a support for said cooking surface;
    a heat source;
    a hood unit disposed on a top surface of said support; and
    translation means for linearly transporting together said cooking surface, said support, and said hood unit from a first position over said heat source to a second position linearly offset from said heat source.

23. A portable kitchen for outdoor use, comprising:
    a cooking surface;
    a support for said cooking surface;
    a heat source;
    a hood unit disposed on a top surface of said support;
    wherein said cooking surface, said support, and said hood are slidably supported to be transported together from a first position over said heat source to a second position linearly offset from said heat source.

* * * * *

UNITED STATES PATENT AND TRADEMARK OFFICE
CERTIFICATE OF CORRECTION

| | | |
|---|---|---|
| PATENT NO. | : 5,970,855 | Page 1 of 6 |
| APPLICATION NO. | : 09/044184 | |
| DATED | : October 26, 1999 | |
| INVENTOR(S) | : Vance Patterson, Mary Patterson and Donald Thomas | |

It is certified that error appears in the above-identified patent and that said Letters Patent is hereby corrected as shown below:

Fig. 1 (Sheet 1 of 6) does not belong with U.S. Patent No. 5,970,855

Figure 2:
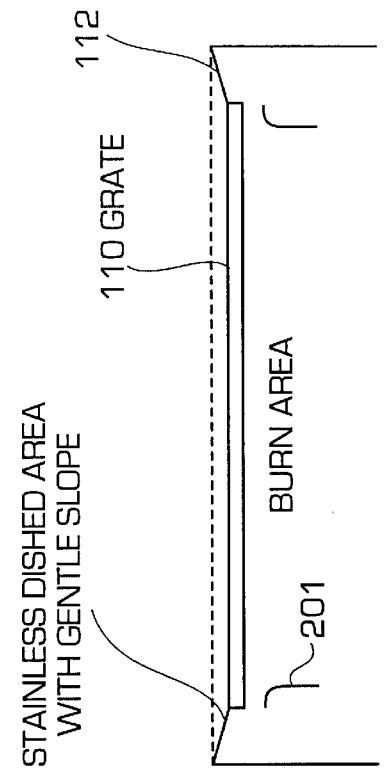
FIG. 2 schematically illustrates the cooking area.
Figure 5:
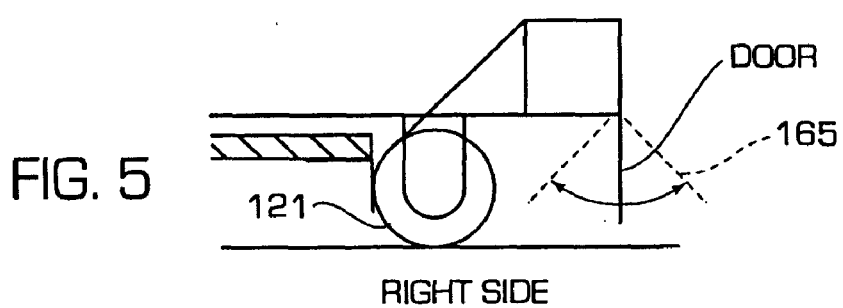
Figure 5A:
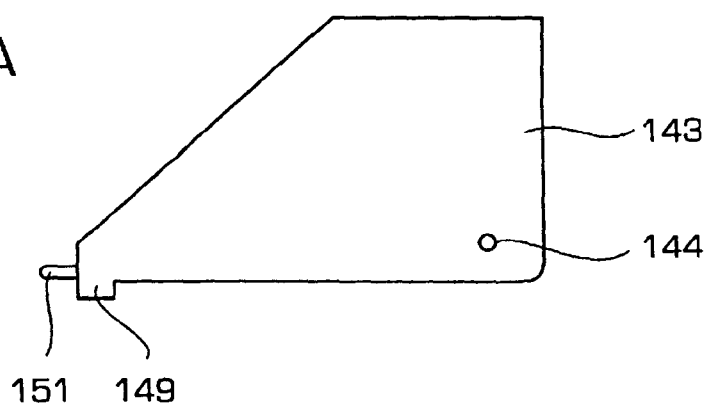
Figure 5B:
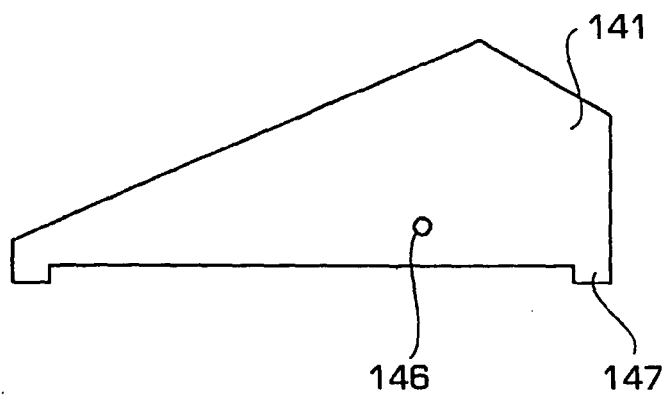
Figure 5C:
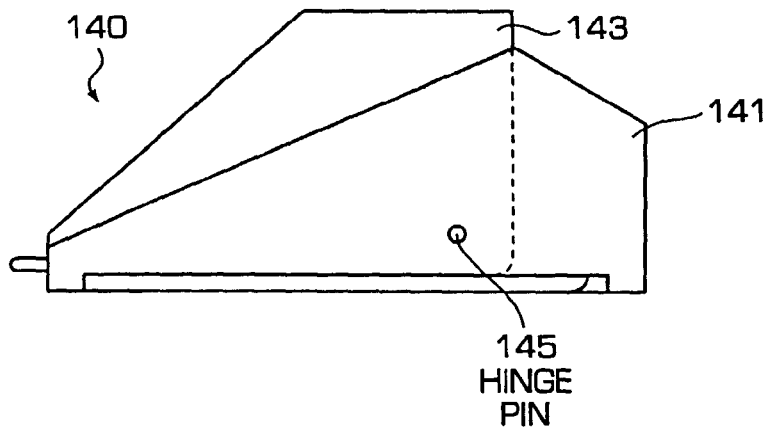

Labeling of Figures for this patent should begin with Fig. 1A (Sheet 1 of 6) and continue for a total of five (5) sheets as follows: Fig. 1B, Fig. 1C (Sheet 2 of 6); Fig. 1D, Fig. 2 (Sheet 3 of 6); Fig 3, Fig. 4, Fig. 5 (Sheet 4 of 5); and Fig. 5A, Fig. 5B, Fig. 5C (Sheet 5 of 5). As shown by the attached sheets Signed and Sealed this Seventeenth Day of October, 2006

JON W. DUDAS
*Director of the United States Patent and Trademark Office*